Patented Oct. 8, 1929

1,730,850

UNITED STATES PATENT OFFICE

SAMUEL ISERMANN, OF ORANGE, AND JOHN W. ORELUP, OF EAST ORANGE, AND ERNST OHLSSON, OF JERSEY CITY, NEW JERSEY

DENATURANT

No Drawing.    Application filed May 24, 1927.  Serial No. 193,945.

Our present invention relates to the denaturing of ethyl alcohol and it is an object thereof to provide a denaturant which to a satisfactory degree will fulfill the following requirements (1) of being non-poisonous to human beings in reasonably small amounts and without appreciable physiological action, (2) of being difficult to separate from the alcohol either by distillation or by any simple chemical treatment, (3) of being distasteful or nauseating in very small amounts, (4) of being miscible in any proportion with alcohol, (5) of leaving no residue on distillation, (6) of easy manufacture and availability.

We have now discovered that these desirable qualities and others are possessed by the halogen substitution products of phenol. Examples of these which are particularly suitable are the monochlorphenols, the dichlorphenols, also the corresponding bromo and iodo phenols.

The odor and taste of the above substances are very disagreeable, and when admixed with alcohol and water are very difficult to remove, even under extraordinary physical and chemical treatment. The amount required of these substances is small, and we preferably employ in the neighborhood of one-tenth of one per cent thereof. In these amounts the substances mentioned are to be considered non-poisonous.

In practice we prefer the chlorphenols, as these compounds are cheaper and more easily prepared than the corresponding bromo and iodo compounds. In particular, we prefer a mixture of the ortho and para monochlorphenols, as both compounds are formed in the same chlorination step, thus rendering separation of these unnecessary. Furthermore, the mixture has the advantage over either compound alone, in that it is liquid at room temperature.

While we have named several compounds as illustrating the invention, it will be understood that various similarly related compounds are to be considered the equivalent of those mentioned.

We claim:

1. Denatured ethyl alcohol containing as a denaturant a halogen substitution product of phenol.

2. Denatured ethyl alcohol containing as a denaturant a chlorine substitution product of phenol.

3. Denatured ethyl alcohol containing as a denaturant a mixture of ortho and para chlorphenol.

In testimony whereof we have affixed our signatures to this specification.

SAMUEL ISERMANN.
JOHN W. ORELUP.
ERNST OHLSSON.